(12) United States Patent
Kromis et al.

(10) Patent No.: US 6,758,300 B2
(45) Date of Patent: Jul. 6, 2004

(54) EXHAUST ISOLATOR SYSTEM

(75) Inventors: Peter J. Kromis, Grass Lake, MI (US); Joseph F. Cerri, III, Milan, OH (US)

(73) Assignee: The Pullman Company, Milan, OH (US)

( * ) Notice: Subject to any disclaimer, the term of this patent is extended or adjusted under 35 U.S.C. 154(b) by 40 days.

(21) Appl. No.: 10/079,037

(22) Filed: Feb. 20, 2002

(65) Prior Publication Data

US 2003/0155169 A1 Aug. 21, 2003

(51) Int. Cl.⁷ .................. B60K 13/04; E21F 17/02; F16M 13/00; F01N 7/00
(52) U.S. Cl. .................. 180/309; 180/296; 180/89.2; 248/60; 248/610; 248/635; 60/322
(58) Field of Search .................. 180/309, 296, 180/297, 299, 89.2; 248/49, 60, 609, 610, 632, 635; 293/113; 267/141, 153; 181/212, 227, 228, 232, 241; D12/194; 60/322

(56) References Cited

U.S. PATENT DOCUMENTS

| 3,977,486 A | | 8/1976 | Kleinschmit |
| 4,019,599 A | * | 4/1977 | Strunk .................. 180/309 |
| 4,063,700 A | * | 12/1977 | Brewer .................. 248/62 |
| 4,494,722 A | * | 1/1985 | Kanai et al. .................. 248/621 |
| 4,550,795 A | | 11/1985 | Teshima |
| 4,634,088 A | * | 1/1987 | Schad .................. 248/60 |
| 4,638,965 A | * | 1/1987 | DeBruine et al. .................. 248/59 |
| 4,796,841 A | | 1/1989 | Baker et al. |
| 4,824,056 A | * | 4/1989 | Wuebker et al. .................. 248/60 |
| 4,893,778 A | | 1/1990 | Drabing et al. |
| 5,127,489 A | | 7/1992 | Takato et al. |
| 5,323,989 A | | 6/1994 | Hamada et al. |
| 5,445,241 A | | 8/1995 | Nakamura et al. |
| 5,507,463 A | * | 4/1996 | Kobylinski et al. .................. 248/610 |
| 5,716,397 A | * | 2/1998 | Myers .................. 181/232 |
| 5,890,685 A | * | 4/1999 | Takahashi .................. 248/74.3 |
| 5,908,187 A | | 6/1999 | Kalkoske et al. |
| 6,070,849 A | | 6/2000 | Larmande et al. |
| 6,402,119 B1 | * | 6/2002 | Miska .................. 248/613 |

* cited by examiner

Primary Examiner—Brian L. Johnson
Assistant Examiner—G B Klebe
(74) Attorney, Agent, or Firm—Harness, Dickey & Pierce, PLC

(57) ABSTRACT

An exhaust system has a plurality of isolator assemblies which are used to mount the exhaust system to a vehicle. Each of the isolator assemblies has an exhaust rod which is attached to a component of the exhaust system and which includes a first end which engages an elastomeric isolator attached to the vehicle through a U-shaped member. Each of the first ends of the exhaust rods are aligned to be generally parallel with the longitudinal axis of the vehicle when the exhaust system is installed in the vehicle.

8 Claims, 2 Drawing Sheets

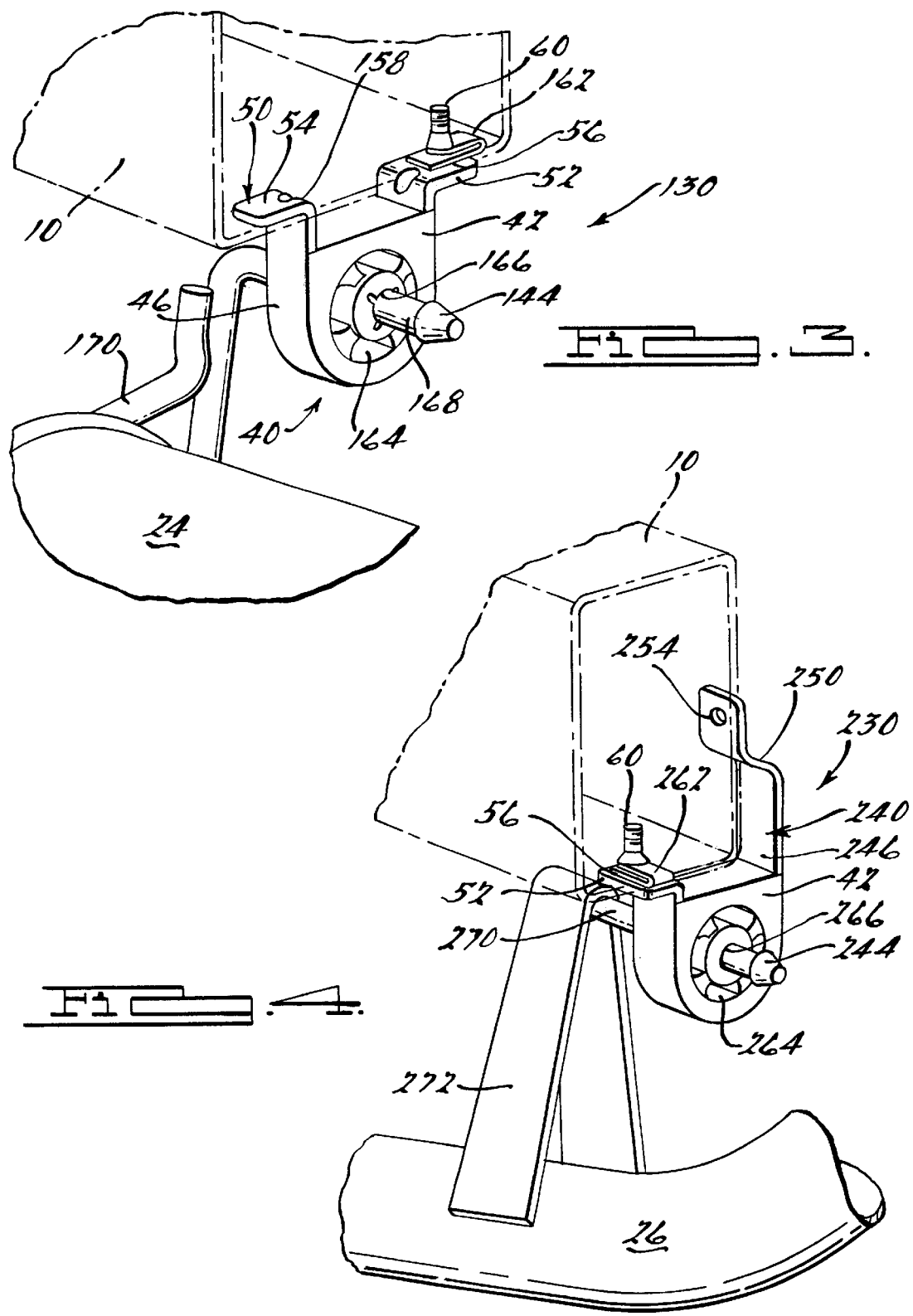

EXHAUST ISOLATOR SYSTEM

FIELD OF THE INVENTION

The present invention relates to a mounting arrangement for an exhaust system of a vehicle. More particularly, the present invention relates to a unique exhaust isolator system that provides vibration isolation between the exhaust system and the vehicle while providing superior alignment capability during the assembly operation of the exhaust system.

BACKGROUND OF THE INVENTION

Typically, automotive vehicles including cars and trucks have an internal combustion engine which is coupled to at least a transmission and a differential for providing power to the driven wheels of the vehicle. An engine exhaust system which typically includes an exhaust pipe, a catalytic converter and a muffler is attached to the engine to quiet the combustion process, to clean the exhaust gases and to route the products of combustion away from the engine. The internal combustion engine is supported in the vehicle on a set of engine mounts which are positioned between a frame or other supporting structure and the engine. The exhaust system is supported by exhaust mounts which are positioned between the exhaust system and the frame or other supporting structure of the body. In order to prevent engine vibrations from being transmitted to the car body, the exhaust mounts incorporate flexible mounting members or elastic suspension members. The exhaust mounts also include an upper hanger having one end secured to the vehicle body or the like and the other end connected to the flexible mounting member and a lower hanger having one end connected to the flexible member and the other end secured to the exhaust system.

The elastic suspension member is typically designed to allow a large displacement in a first direction but it is restricted in its displacement in a second direction which is typically ninety degrees from the first direction. Thus, displacement or vibrations in the first direction are effectively absorbed while displacement or vibrations in the second direction are less effectively absorbed. In addition, the assembly of the vehicle and the exhaust system to the vehicle have to take into consideration the exhaust mounts and any preloading of the elastic members which can unnecessarily complicate the assembly process.

While the prior exhaust mounts have proved effective in the isolation of engine vibrations, the continued development of these exhaust mounts has been directed toward mounting systems that are more effective in their isolation properties, that can function effectively in more than a single direction and which simplify the assembly of the vehicle and the assembly of the exhaust system to the vehicle.

SUMMARY OF THE INVENTION

The present invention provides the art with a unique exhaust isolator system that provides vibration isolation between the exhaust system and the vehicle while providing superior alignment capability for the assembly of the exhaust system to the vehicle. The exhaust isolator system utilizes three isolators to support the muffler and the tailpipe assembly. One isolator is placed forward of the muffler, one isolator is placed rearward of the muffler and one isolator is placed on the tailpipe. Each isolator includes a metal bracket attached to the vehicle, an elastomer isolator supported by the metal bracket and a support rod which extends between the elastomer isolator and the exhaust system (muffler and tailpipe assembly). The support rods are all aligned parallel with the longitudinal axis of the vehicle. This allows the support rods to slide axially in the elastomer isolator thus preventing the isolator from over constraining the exhaust system as it heats up and expands to its operating state.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 3 is a perspective of another one of the isolators shown in FIG. 1; and

FIG. 4 is a perspective of another one of the isolators shown in FIG. 1.

DETAILED DESCRIPTION OF THE PREFERRED EMBODIMENTS

The following description of the preferred embodiment(s) is merely exemplary in nature and is in no way intended to limit the invention, its application, or uses.

Figure 1:
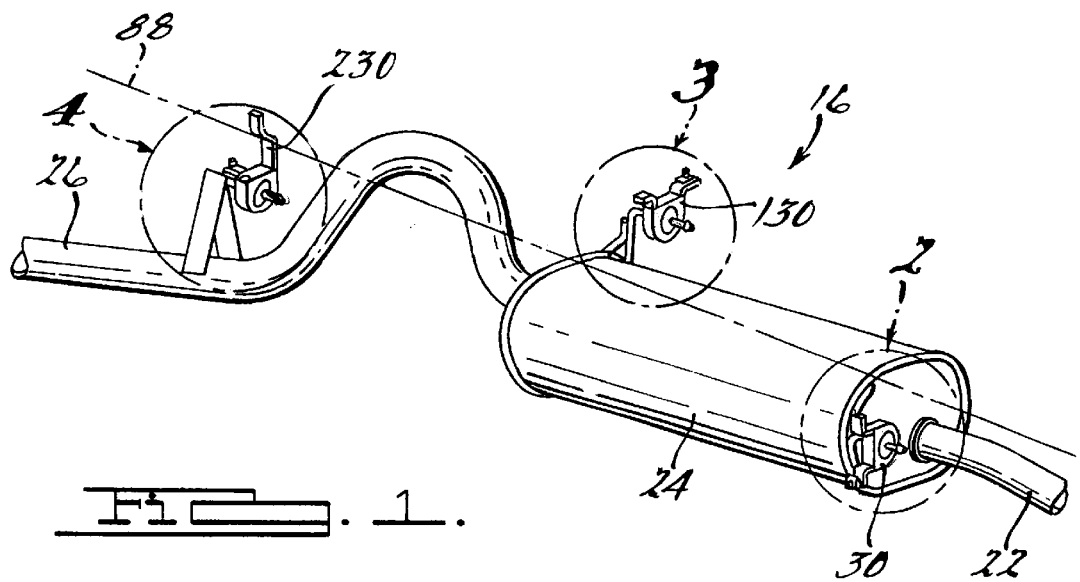
FIG. 1 is a perspective view of an exhaust system which incorporates the unique exhaust isolator system in accordance with the present invention.

Referring now to the drawings in which like reference numerals designate like or corresponding parts throughout the several views, there is shown in FIG. 1, a unique exhaust isolator system in accordance with the present invention which is secured to a vehicle. The vehicle comprises an internal combustion engine (not shown), a body (not shown) and an exhaust system 16 which is attached to the engine and the body. The internal combustion engine is designed to power one or more drive wheels of the vehicle.

Exhaust system 16 comprises an intermediate pipe 22, a muffler 24, a tailpipe 26 and a plurality of isolator assemblies 30, 130 and 230. Intermediate pipe 22 is typically connected to a catalytic converter (not shown) which is attached to an exhaust pipe which is in turn attached to an exhaust manifold (not shown) which is one of the components of the vehicle's internal combustion engine. The catalytic converter may be attached to a single exhaust pipe which leads to a single exhaust manifold or the catalytic converter can be attached to a branched exhaust pipe which leads to a plurality of exhaust manifolds. Also, intermediate pipe 22 can be attached to a plurality of catalytic converters which connect together prior to reaching muffler 24 using intermediate pipe 22 or the vehicle can have a plurality of exhaust pipes, a plurality of catalytic converters, a plurality of intermediate pipes 22 and a plurality of mufflers 24 which connect together using a single tailpipe 26. In addition, the present application is applicable to exhaust systems which are termed "dual exhaust systems" in that they have two separate parallel exhaust systems extending from a single internal combustion engine.

Exhaust system 16 is utilized to route the exhaust gasses from the engine to the rear area of the vehicle. While traveling from the engine to the rear of the vehicle, the catalytic converter cleans the exhaust gasses and muffler 24 quiets the noise created by the combustion process in the engine. Isolator assemblies 30, 130 and 230 support exhaust system 16 underneath the vehicle and they operate to prevent engine vibrations from being transmitted to the vehicle's body. In addition, isolator assemblies 30, 130 and 230 provide superior alignment capabilities during the assembly of exhaust system 16 into the vehicle.

Figure 2:
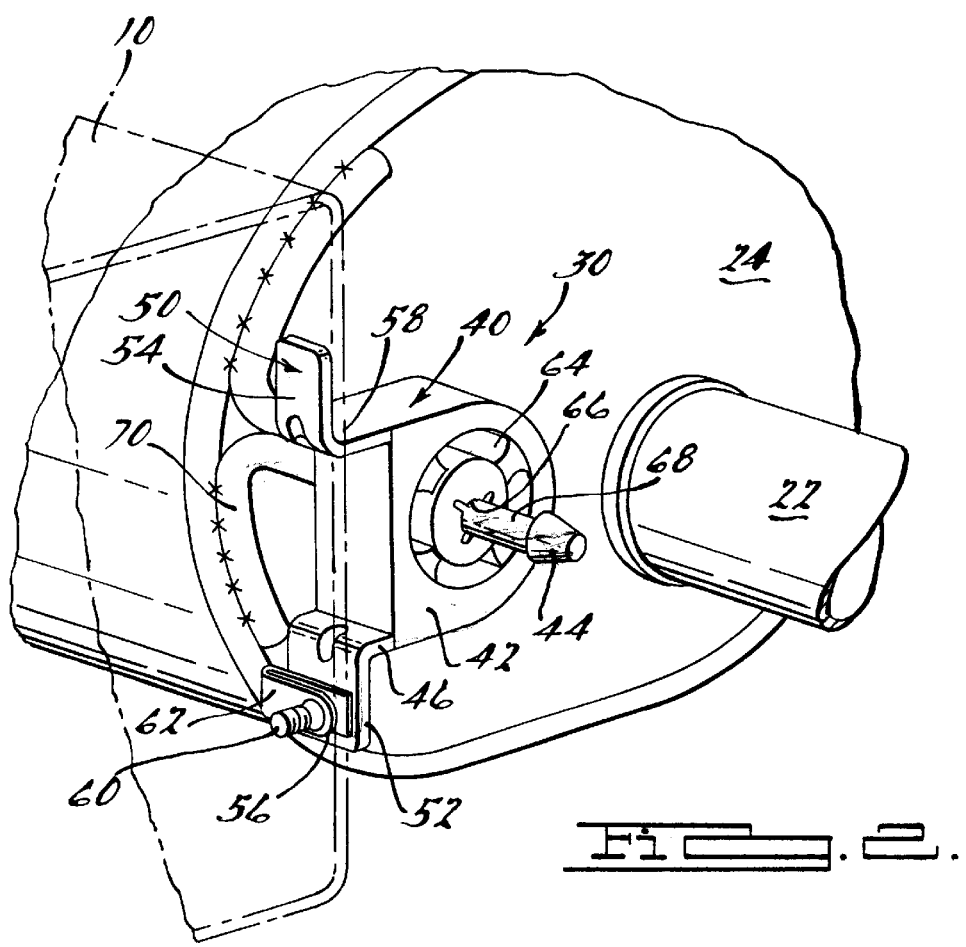
FIG. 2 is a perspective view of one of the isolators illustrated in FIG. 1.

Referring now to FIG. 2, isolator assembly 30 comprises an exterior bracket 40, an elastomeric isolator 42 and an exhaust rod 44. Exterior bracket 40 comprises a generally U-shaped member 46 which is utilized to secure isolator assembly 30 to the vehicle. FIG. 2 illustrates isolator assembly 30 which is designed to be secured to the front side (in the vehicle's direction) of muffler 24.

U-shaped member 46 is illustrated having a first flange 50 and a second flange 52. Each flange 50 and 52 is adapted to be secured to the vehicle. Flange 50 defines a tab 54 and flange 52 defines a through bolt hole 56. Tab 54 is designed to engage a hole 58 formed in a portion of the vehicle's structure. A bolt 60 extends through bolt hole 56 for securing U-shaped member 46 of exterior bracket 40 and thus isolator assembly 30 to the vehicle by mating with a threaded member 62 attached to or formed as an integral member of a portion of the vehicle's structure.

Elastomeric isolator 42 is disposed within the inner pocket formed by U-shaped member 46 and it is designed to mate with U-shaped member 46 by having a generally cylindrical end surface and to mate with a generally flat surface on the vehicle by having a generally planar end surface. Elastomeric isolator 42 can be formed from silicone (for high temperature applications), EPDM (ethylene-propylene-diene monomer) (for moderate temperature applications), natural rubber (for low temperature applications), or any other elastomer which meets the requirements of the application. Elastomeric isolator 42 can be bonded to U-shaped member 46, if desired. Elastomeric isolator 42 defines a plurality of voids 64 which are engineered in size, shape and location to control the dynamic rate of isolator assembly 30, the insertion force for isolator assembly 30, the system durability requirements for isolator assembly 30 as well as other developmental and performance characteristics for isolator assembly 30. Elastomeric isolator 42 also defines a through bore 66 through which exhaust rod 44 is inserted.

Exhaust rod 44 is a formed rod which includes compound bends such that a first end 68 is positioned to axially engage bore 66 and a second end 70 is designed to mate with and be secured to a component of exhaust system 16. In the illustrated embodiment, exhaust rod 44 is attached to the front of muffler 24 but it is within the scope of the present invention to attach exhaust rod 44 to any other component of exhaust system 16, if desired.

Referring now to FIG. 3, an isolator assembly 130 of a slightly different design is illustrated. Isolator assembly 130 comprises exterior bracket 40, elastomeric isolator 42 and an exhaust rod 144. Exterior bracket 40 comprises generally U-shaped member 46 which, as detailed above, is utilized to secure isolator assembly 130 to the vehicle. FIG. 3 illustrates isolator assembly 130 which is designed to be secured to the rear side (in the vehicle's direction) of muffler 24.

U-shaped member 46 is illustrated having first flange 50 and second flange 52. Each flange 50 and 52 is adapted to be secured to the vehicle. Flange 50 defines tab 54 and flange 52 defines through bolt hole 56. Tab 54 is designed to engage a hole 158 formed in a portion of the vehicle's structure. Bolt 60 extends through bolt hole 56 for securing U-shaped member 46 of bracket 40 and thus isolator assembly 30 to the vehicle by mating with a threaded member 162 attached to or formed as an internal member of a portion of the vehicle's structure.

Elastomeric isolator 42 is disposed within the inner pocket formed by U-shaped member 46 and it is designed to mate with U-shaped member 46 by having a generally cylindrical end surface and to mate with a generally flat surface on the vehicle by having a generally planar end surface. Elastomeric isolator 42 can be formed from silicone, EPDM, natural rubber or other materials as detailed above. Elastomeric isolator 42 can be bonded to U-shaped member 46 if desired. Elastomeric isolator 42 defines a plurality of voids 164 which are engineered in size, shape and location to control the dynamic rate of isolator assembly 130, the insertion force for isolator assembly 130, the durability requirements for isolator assembly 130 as well as other developmental and performance characteristics for isolator assembly 130. Voids 164 may or may not be the same as voids 64 of isolator assembly 30. Elastomeric isolator 42 also defines a through bore 166 through which exhaust rod 144 is inserted.

Exhaust rod 144 is a formed rod which includes compound bends such that a first end 168 is positioned to axially engage bore 166 and a second end 170 is designed to mate with and be secured to a component of exhaust system 16. In the illustrated embodiment, exhaust rod 144 is attached to the rear of muffler 24 but it is within the scope of the present invention to attach exhaust rod 144 to any other component of exhaust system 16 if desired.

Referring now to FIG. 4, an isolator assembly 230 of a slightly different design is illustrated. Isolator assembly 230 comprises an exterior bracket 240, elastomeric isolator 42 and an exhaust rod assembly 244. Exterior bracket 240 comprises a generally U-shaped member 246 which, similar to that described above for U-shaped member 46, is utilized to secure isolator assembly 230 to the vehicle. FIG. 4 illustrates isolator assembly 230 which is designed to be secured to tailpipe 26.

U-shaped member 246 is illustrated having a first formed end 250 and second flange 52. Formed end 250 and second flange 52 are adapted to be secured to the vehicle. Formed end 250 is contoured to mate with the supporting structure of the vehicle and it defines a through bolt hole 254. A bolt extends through bolt hole 254 for securing U-shaped member 246 of bracket 240 and thus isolator assembly 230 to the vehicle by mating with a threaded member attached to or formed as an integral member of a portion of the vehicle's structure. Flange 52 defines bolt hole 56. Bolt 60 extends through bolt hole 56 for securing U-shaped member 246 of bracket 240 and thus isolator assembly 230 to the vehicle by mating with another threaded member 262 attached to or formed as an integral member of a portion of the vehicle's structure.

Elastomeric isolator 42 is disposed within the inner pocket formed by U-shaped member 246 and it is designed to mate with U-shaped member 246 by having a generally cylindrical end surface and to mate with a generally flat portion on the vehicle by having a generally planar end surface. Elastomeric isolator 42 can be formed from silicone, EPDM, natural rubber or other materials as detailed above. Elastomeric isolator 42 can be bonded to U-shaped member 246 if desired. Elastomeric isolator 42 defines a plurality of voids 264 which are engineered in size, shape and location to control the dynamic rate of isolator assembly 230, the insertion force for isolator assembly 230, the durability requirements for isolator assembly 230 as well as other developmental and performance characteristics for isolator assembly 230. Void 264 may or may not be the same as voids 164 of isolator assembly 130 and may or may not be the same as voids 64 of isolator assembly 30. Elastomeric isolator 42 also defines a through bore 266 through which exhaust rod assembly 244 is inserted.

Exhaust rod assembly 244 comprises an exhaust rod 270 and a V-shaped bracket 272. Exhaust rod 270 is a generally straight rod which is positioned to axially engage bore 266. V-shaped bracket 272 is attached to exhaust rod 270 at one end and it is designed to mate with and be secured to a component of exhaust system 16 at its opposite end. In the illustrated embodiment, V-shaped bracket 272 is attached to tailpipe 26 but it is within the scope of the present invention to attach V-shaped bracket 272 to any other component of exhaust system 16 if desired.

Referring now to FIG. 1, exhaust system 16 includes isolator assembly 30 located forward of muffler 24, isolator assembly 130 located behind muffler 24 and isolator assembly 230 located on tailpipe 26. While exhaust system 16 is illustrated with three isolator assemblies 30, 130 and 230 being positioned at the specific locations detailed above, it is within the scope of the present invention to utilize a fewer number or a greater number of isolator assemblies located anywhere along exhaust system 16 as required by the specific application. Each isolator assembly 30, 130 or 230 provides a failsafe design by having U-shaped member 46 or 246 in connection with the mounting surface on the vehicle fully encircle exhaust rod 44, 144 or 244. By fully encircling exhaust rod 44, 144 or 244, exhaust system 16 is prevented from being unsupported at any isolator assembly should elastomeric isolator 42 deteriorate to the point of not being able to support exhaust system 16.

Each isolator assembly 30, 130 and 230 is oriented with respect to the vehicle such that bores 66, 166 and 266 of elastomeric isolator 42 and the mating end of exhaust rods 44, 144 and 244 extend generally parallel to the fore and aft direction of the vehicle or generally parallel to a longitudinal axis 88 defined by exhaust system 16 which is adapted to be parallel to the longitudinal axis of the vehicle which extends from the front center to the rear center of the vehicle. This unique orientation of isolator assemblies 30, 130 and 230 allows exhaust system 16 to be aligned using only one of isolator assemblies 30, 130 and 230 while the remaining isolator assemblies 30, 130 or 230 can be delivered part-in-assembly with exhaust system 16 prior to being assembled to the vehicle. Furthermore, once all isolator assemblies 30, 130 and 230 are secured, exhaust system 16 is aligned in its natural or free state for noise, vibration and harshness (NVH) characteristics unlike the prior art exhaust isolator systems. An additional advantage to the longitudinal alignment of isolator assemblies 30, 130 and 230 is that they will allow for thermal growth of exhaust system 16. This longitudinal alignment of exhaust rods 44, 144 and 244 allow the exhaust rods to individually and simultaneously slide longitudinally in elastomeric isolators 42 and thus prevent isolator assemblies 30, 130 and 230 from over-constraining exhaust system 16 as it heats up and lengthens to its operating state.

Finally, the cylindrical shape of elastomeric isolator 42 allows it to be dynamically tuned in two directions using voids 64, 164 and 264, as opposed to the conventional prior art two rod isolators which are unidirectional. This allows for increased isolation and precise tuning to minimize localized forces which are transmitted to the vehicle. In addition, the isolator in bracket design allows for extremely high resonant frequencies as opposed to the prior art designs which significantly lower vehicle side resonance. This allows added stiffness on the exhaust side rod to increase resonant frequencies of the entire isolator system.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. An exhaust system defining a longitudinal axis which is adapted to be generally parallel with a longitudinal axis of a vehicle, said exhaust system comprising:

an intermediate pipe;

a muffler attached to said intermediate pipe;

a tailpipe attached to said muffler; and three isolator assemblies for attaching said exhaust system to said vehicle, each of said three isolator assemblies being attached to one other a component of said exhaust system, each of said three isolator assemblies including an exhaust rod having a first end disposed generally parallel to said longitudinal axis of said exhaust system and a second end attached to said component of said exhaust system such that all first ends of said three isolator assemblies are disposed parallel to each other and parallel to said longitudinal axis of said exhaust system, each of said three isolator assemblies further comprising:

an elastomeric isolator defining a bore, said first end of a respective exhaust rod being disposed within said bore; and a bracket disposed around said elastomeric isolator and around said exhaust rod, said bracket being adapted for direct attachment to said vehicle, said bracket providing a failsafe attachment for said isolator assembly.

2. The exhaust system according to claim 1 wherein each of said bores is disposed generally parallel with said longitudinal axis of said exhaust system.

3. The exhaust system according to claim 1 wherein said bracket comprises a generally U-shaped member.

4. The exhaust system according to claim 1 wherein said elastomeric isolator defines a plurality of voids disposed around said bore.

5. The exhaust system according to claim 1 wherein said three isolator assemblies comprises a first isolator assembly attached between a first end of said muffler and a first end of said intermediate pipe, a second isolator assembly attached between a second end of said muffler and an end of said tailpipe and a third isolator assembly attached to said tailpipe.

6. The exhaust system according to claim 5 wherein each of said bores is disposed generally parallel with said longitudinal axis of said exhaust system.

7. The exhaust system according to claim 5 wherein said bracket comprises a generally U-shaped member.

8. The exhaust system according to claim 5 wherein said elastomeric isolator defines a plurality of voids disposed around said bore.

* * * * *